United States Patent [19]

Reuter et al.

[11] Patent Number: 5,357,800
[45] Date of Patent: Oct. 25, 1994

[54] METHOD FOR AIR TESTING HYDRAULIC BRAKE COMPONENTS

[75] Inventors: Brian T. Reuter, Farmington; Gary A. Willi, Ann Arbor, both of Mich.

[73] Assignee: Kelsey-Hayes Company, Romulus, Mich.

[21] Appl. No.: 998,963

[22] Filed: Dec. 30, 1992

[51] Int. Cl.⁵ .............................................. G01L 5/28
[52] U.S. Cl. .................................... 73/121; 73/39; 73/168; 417/53
[58] Field of Search ............... 73/121, 39, 168, 49.7; 188/141; 415/118; 417/63

[56] References Cited

U.S. PATENT DOCUMENTS

| | | | |
|---|---|---|---|
| 3,213,674 | 10/1965 | Salcido et al. | 73/49.8 |
| 3,584,500 | 6/1971 | Diehl et al. | 73/39 |
| 3,596,500 | 8/1971 | Rees . | |
| 3,727,453 | 4/1973 | Rees . | |
| 3,958,454 | 5/1976 | Rasch | 73/121 |
| 4,705,459 | 11/1987 | Buisine et al. | 417/63 |
| 4,719,796 | 1/1988 | Zenker | 73/121 |
| 4,888,980 | 12/1989 | Derome . | |
| 4,893,494 | 1/1990 | Hart . | |
| 5,000,664 | 3/1991 | Lawless et al. . | |

OTHER PUBLICATIONS

Sessions, Ron, *Turbo-Hydramatic 350 Handbook*, 1985, HP Books, Los Angeles, p. 64.

*Primary Examiner*—Tom Noland
*Assistant Examiner*—James M. Olsen
*Attorney, Agent, or Firm*—MacMillan, Sobanski & Todd

[57] ABSTRACT

A production functional test for hydraulic brake control and traction control units which utilizes compressed air as a test medium. Compressed air is applied to an external port of a hydraulic brake or traction control unit which includes valves, accumulators and a positive displacement pump driven by an electric motor connected by internal passageways. The air pressure at another external port is monitored while the various components are exercised according to a test sequence. The monitored pressure must be within predetermined limits at various points of the test to demonstrate that the brake control unit is functioning properly. Air flow rates and pump motor current are also measured at specific points in the test. The test method can identify incorrectly sized and installed components.

27 Claims, 13 Drawing Sheets

METHOD FOR AIR TESTING HYDRAULIC BRAKE COMPONENTS

BACKGROUND OF THE INVENTION

The present invention relates generally to testing of hydraulic components and, in particular, to air testing vehicle hydraulic brake components such as those found in vehicle anti-lock brake and/or traction control systems.

Anti-lock brake and traction control systems are becoming increasingly popular with purchasers of vehicles. Generally, anti-lock brake systems include sensors for monitoring the speed of the controlled wheels and a Central Control Unit (CCU) to determine when an impending wheel lock-up condition is present during vehicle braking. When a predetermined slippage has been detected at the controlled wheels, the CCU functions to control the application of hydraulic pressure to the associated brakes to prevent lock-up of the controlled wheels.

Typically, the Anti-lock Brake System (ABS) includes solenoid actuated valve means for cyclically relieving and reapplying hydraulic pressure to the associated brakes. The valve means operate to limit wheel slippage to a safe level, while continuing to produce adequate brake torque to decelerate the vehicle as desired by the driver. When reapplying pressure, the valve means are supplied pressurized hydraulic fluid from a positive displacement hydraulic pump or the brake system master cylinder. The ABS can also include hydraulic fluid storage reservoirs, or accumulators. Check valves can also be included to control the direction of flow of hydraulic fluid within the system. Traction Control Systems (TCS) typically include additional valves for applying braking force to reduce wheel spin upon a slippery surface and thereby redistribute the power being delivered between the driven wheels.

Typically, the solenoid valves, pump, accumulators and other components, or subassemblies, are assembled in an ABS and/or TCS Hydraulic Control Unit (HCU). The HCU includes internal passageways which provide communication between the different system components contained therein. External ports formed in the HCU allow connection of hydraulic lines for communication with a conventional brake master cylinder and the wheel brakes.

It is known in the art to functionally test assembled HCUs to confirm correct assembly thereof before shipping to vehicle manufacturers. The functional tests also are designed to assure that the HCUs conform to operational specifications. Such prior art tests typically consist of mounting an assembled HCU upon a test stand, filling the HCU with hydraulic fluid, connecting the HCU external ports to test equipment and electrically connecting the HCU to a CCU. The CCU exercises the HCU components to simulate anti-lock braking or traction control cycles while various hydraulic pressures are measured by the test equipment and compared to specified limits.

Functional tests utilizing hydraulic fluid as a test medium tend to be time consuming, requiring evacuation of all air from the HCU to assure accurate test results. It is necessary to control the hydraulic fluid temperature, avoid aeration of the hydraulic fluid and prevent fluid contamination with small particles of dirt or metal.

Functional testing using hydraulic fluid involves a closed test loop during which the fluid is recirculated within the HCU. Under these conditions, it has been found that the CCU can modify the performance of one component in the HCU to compensate for another slightly defective component. This can effectively mask a defect which potentially can develop into a more serious problem during operation of the HCU on a vehicle. In a similar manner, the CCU also has, under test conditions, compensated for incorrectly sized components that were mistakenly installed in the HCU. Furthermore, it has been found difficult to remove all hydraulic fluid from the HCU after testing for shipping the unit to the vehicle manufacturer. Residual fluid in the HCU will tend to cause evacuation and fluid fill problems at the customer's assembly plant.

SUMMARY OF THE INVENTION

This invention relates to a production functional test method for hydraulic brake components which utilizes; compressed air or inert gases as the test medium. While the principles of this invention are effective to test any hydraulic component of a vehicle brake system, they are especially advantageous for testing anti-lock brake and/or traction control systems, since these systems typically include a number of separate components, or subassemblies, whose individual operation is affected by other components. With the method of this invention, a hydraulic control unit for an anti-lock brake and/or traction control system can be functionally tested without introducing any hydraulic fluid into the control unit. Additionally, the test method can be applied to other hydraulically controlled systems and to individual hydraulic valves.

An anti-lock brake and/or traction control system typically includes a Hydraulic Control Unit (HCU) which has an inlet port adapted to be connected to a conventional vehicle brake master cylinder and one or more outlet ports adapted to be connected to conventional vehicle wheel brake cylinders. The HCU further includes hydraulic valve means for controlling fluid pressure at the outlet port. The valve means typically include solenoid operated control valves. The HCU also can include a positive displacement fluid pump driven by an electric motor to supply pressurized hydraulic fluid to the valve means. When a pump is used, a high pressure relief valve is usually included in the HCU between the pump intake and discharge ports to protect the control unit from overpressurization. HCUs also typically include one or more fluid accumulators for temporary storage of hydraulic fluid. Such accumulators include an axially movable piston disposed within an accumulator bore formed in the HCU body and a bias spring for urging the piston into the bore.

The invention test method generally involves a series of component functional tests during which compressed air, or another suitable pressurized gas, is applied to one of the HCU ports and the air pressure at another HCU port is monitored while the valve means and pump are operated in a predetermined sequence. The HCU port air pressure is monitored at each step of the valving sequence and must be within a predetermined pressure range for each step of the valving sequence to verify satisfactory control valve operation. At various points in the testing, air flow rates are measured and compared to predetermined limits to determine if the HCU is leaking. During pump operation, the pump motor current is sensed and compared to operational specifications. The pump is required to further compress the air and thereby increase the air pressure by a specified amount and at a specified rate to demonstrate satisfactory operation.

Failure to successfully complete any test step is indicative of several potential problems with the control valve. These problems include incorrect assembly of control valve components, incorrect installation of valve components, or installation of incorrectly sized valve components for the particular control valve undergoing testing.

The test method further includes a functional test of the high pressure relief valve. The relief valve test includes manually exercising the valve while monitoring the HCU port air pressure. The air pressure changes confirm opening and closing of the relief valve.

Accumulators are functionally tested by inserting a movable probe into the accumulator bore and against the piston face. The probe is connected to a transducer which generates a signal when the probe moves axially within the bore. Compressed air is applied to the HCU and the valve means are operated in a predetermined sequence to supply compressed air to the accumulator. The compressed air causes the accumulator piston to shift axially within the accumulator bore, thereby pushing the probe partially out of the bore. The associated movement of the probe is monitored as an indication of piston axial displacement and rate of movement within the accumulator bore. The amount of piston displacement must be within specified ranges to confirm correct sizing, assembly and operation of the accumulator. The valve means are then operated to vent the accumulator, allowing the spring to return the piston to its original position within the bore. The return displacement and rate of piston movement are monitored and again must be within predetermined ranges for satisfactory completion of the test.

As a final functional test, a gas at a pressure in the range of the hydraulic operating pressures the HCU will be subject to is applied to the HCU for a predetermined period of time. An excessive rate of leakage of the gas from the control valve during the time period disqualifies the valve.

The method of functional testing of this invention allows identification of a specific malfunctioning component within the HCUs since the individual components contained therein are tested. The test method further identifies any incorrect installation of a component in the HCU. The use of compressed air as a test medium instead of hydraulic fluid reduces the time required for testing of the control units.

Various objects and advantages of this invention will become apparent to those skilled in the art from the following detailed description of the preferred embodiment of the tests, when read in light of the accompanying drawings.

DETAILED DESCRIPTION OF THE PREFERRED EMBODIMENT

Figure 1:
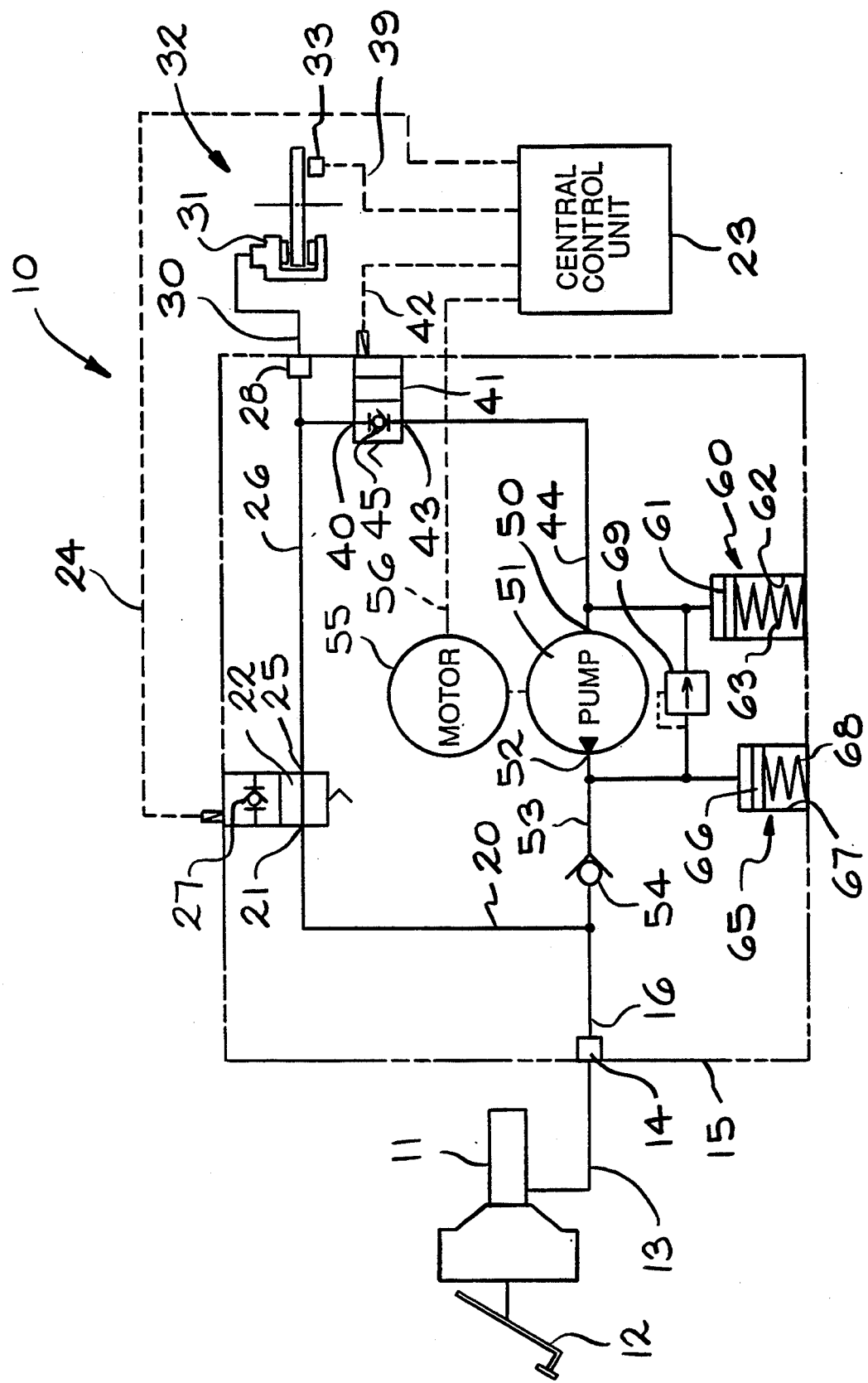
FIG. 1 is a schematic diagram of a typical vehicle anti-lock brake system which includes a hydraulic control unit.

Referring now to the drawings, there is illustrated in FIG. 1 a typical hydraulic Anti-lock Brake System (ABS), shown generally at 10. The brake system 10 includes a conventional vehicle master cylinder 11 operated by a foot pedal 12. The master cylinder 11 is connected by a hydraulic line 13 to an external inlet or master cylinder port 14 formed in an ABS Hydraulic Control Unit (HCU) 15 which is shown in outline with long and short dashes in FIG. 1. In the figures, hydraulic connections are shown as solid lines, electrical connections are shown with dashed lines and mechanical connections are shown with dotted lines.

The master cylinder port 14 is connected through an inlet passageway 16 and a master cylinder passageway 20 formed in the HCU to an inlet port 21 of a normally open solenoid operated isolation, or "apply", valve 22. The apply valve 22 includes a movable armature (not shown) which is actuated by a Central Control Unit (CCU) 23 through an electrical connection 24 to close the valve 22. The apply valve 22 also includes an orifice (not shown) which in combination with the movement of the armature controls the rate of flow of fluid through the valve 22. The size of the orifice and the armature displacement are selected to provide particular operational characteristics for the HCU 15. The apply valve 22 has an outlet port 25 connected through one end of an intermediate passageway 26. The apply valve 22 further includes an internal check valve 27 which functions to relieve the pressure in the intermediate passageway 26 if the foot pedal 12 is released during an ABS cycle.

The other end of the intermediate passageway is connected to an external brake cylinder port 28 formed in the HCU 15. The brake cylinder port 28 is connected through a hydraulic brake line 30 to a hydraulic brake cylinder 31. The hydraulic brake cylinder 31 actuates a wheel brake 32. A sensor 33 monitors the condition of the wheel brake 32 and generates electrical signals which are transmitted through an electrical connector 34 to the CCU 23.

The intermediate passageway 26 is also connected to an inlet port 40 of a normally closed solenoid operated relief, or "dump", valve 41. The dump valve 41 includes a movable armature (not shown) which is actuated by the Central Control Unit (CCU) 23 through an electrical connection 42 to open the valve 41. The dump valve 41 also includes an orifice (not shown) which in combination with the movement of the armature controls the rate of flow of fluid through the valve 41. The size of the orifice and the armature displacement are selected to provide particular operational characteristics for the HCU 15. The dump valve 41 has an outlet port 43 connected to one end of a brake discharge passageway 44. The dump valve 41 further includes an internal check valve 45, the function of which will be explained below.

The other end of the brake discharge passageway is connected to an intake port 50 of a positive displacement fluid pump 51. The pump 51 has a discharge port 52 which is connected through a pump discharge passageway 53 and a check valve 54 to the master cylinder passageway 20. The check valve 54 isolates the pump 51 from the master cylinder 11 during normal brake operation. The pump 51 is driven by an electric motor 55 which is controlled through an electrical connector 56 by the CCU 23.

A low pressure accumulator 60 is connected to the brake discharge passageway 44. The low pressure accumulator 60 is a variable volume fluid reservoir which includes a slidable plunger 61 disposed within a cylindrical bore 62 formed in the body of the HCU 15. The plunger 61 is biased by a spring 63 to provide a pressure head for the pump intake port 50 and to purge the LPA 60 at the end of the ABS cycle. During purging of the LPA 60, the internal check valve 45 in the dump valve 41 opens, allowing hydraulic fluid to flow out of the LPA 60. The size of the plunger 61 and the spring constant of the bias spring 63 define the operational characteristics of the low pressure accumulator 60.

The HCU 15 also includes a high pressure accumulator 65 connected to the pump discharge passageway 53. The high pressure accumulator 66 is also a variable volume fluid reservoir which includes a slidable plunger 66 disposed within a cylindrical bore 67 formed in the body of the HCU 15. The plunger 66 is biased by a heavy duty spring 68 to maintain any fluid contained within the accumulator 65 at the same pressure as the fluid in the pump discharge passageway 53. Similar to the low pressure accumulator 60, the size of the plunger 66 and the spring constant of the bias spring 68 define the operational characteristics of the high pressure accumulator 65.

Brake pedal feedback resulting form excessive pump output pressure is reduced by a high pressure bypass valve 69 which connects the high pressure accumulator 65 to the low pressure accumulator 60. The bypass valve 69 is normally closed, but opens when the fluid pressure in the pump discharge passageway 53 exceeds a predetermined limit. When the bypass valve 69 opens, high pressure liquid flows into the low pressure accumulator 60, thereby reducing the fluid pressure in discharge passageway 53. While not shown in FIG. 1, the relief valve 69 can be structurally included in the high pressure accumulator 65, as disclosed in U.S. Pat. No. 4,865,399, all of which is herein incorporated by reference.

During braking operations, the CCU 23 is responsive to signals generated by the wheel brake sensor 33 to detect an impending wheel lock-up condition. When this happens, an anti-lock braking cycle is commenced as the CCU 23 actuates the pump 51 to supply pressurized hydraulic fluid to the master cylinder passageway 20 with any excess fluid being stored temporarily in the high pressure accumulator 65. At the same time, the CCU 23 causes the apply valve 22 to close, preventing any further increase in hydraulic pressure at the wheel brake 32. The CCU 23 then causes the dump valve 41 to open releasing hydraulic fluid from the brake cylinder 31 and thereby reducing the hydraulic pressure applied to the wheel brake 32. The released excess hydraulic fluid is stored temporarily in the low pressure accumulator 60. After the potential brake lock-up condition is eliminated, the CCU 23 causes the apply valve 22 to open allowing the pressurized hydraulic fluid to flow into the intermediate passageway 26. This raises the hydraulic pressure at the brake cylinder 31 to partially reapply the wheel brake 32. The above described process may be repeated several times during a typical ABS cycle. During an ABS cycle, the bypass valve 69 opens, if needed, to relieve any excessive hydraulic pressure at the pump discharge port 52.

The HCU 15 described above is designed to match specific requirements for a particular vehicle. Typically, the HCU 15 includes a number of components, or subassemblies, installed in a standard valve body that is used in a number of different hydraulic systems. As described above, the resulting hydraulic system operational characteristics are a function of valve orifice size and armature travel and accumulator piston travel and spring constants. Thus, a particular HCU 15 is assembled from components or subassemblies selected to provide the specified ABS or TCS characteristics required for a particular vehicle.

The ABS illustrated in FIG. 1 is intended to be illustrative of a typical anti-lock brake system. Accordingly, the system has been simplified in the interest of clarity. For example, a differential pressure switch, as described in the above referenced U.S. Patent, which is typically connected to monitor pressures in the lines 20, 26 and 44 has been omitted. Only one wheel brake 32 has been shown in FIG. 1. ABS typically control two or more wheel brakes on a vehicle. Many variations of ABS components are possible. A known ABS includes an isolation valve to separate the brake master cylinder from the ABS and utilizes a three way solenoid valve to both apply and relieve the wheel brake pressure, as disclosed in the above referenced U.S. Patent. Another known ABS, as disclosed in U.S. Pat. No. 4,886,322, which is herein incorporated by reference, does not include a positive displacement pump 51. Such a system derives pressurized hydraulic fluid from the master cylinder only. Other ABSs can include additional check valves to further control the flow of fluid within the HCU or omit the high pressure accumulator. However, the present invention is applicable to all the ABS variations.

While an ABS HCU has been illustrated in FIG. 1, a Traction Control System (TCS) HCU is similar in structure, having additional valves to apply braking to a wheel as needed to redistribute delivery of power between the driven wheels. The invention is applicable to ABS, TCS, other hydraulic systems and individual hydraulic valves. The simplified ABS HCU shown in FIG. 1 was chosen for illustration of the test method of the invention.

The present invention is directed towards functional production testing of a HCU 15 by utilizing compressed air, or some other suitable pressurized gas, as a test medium. Generally, the tests consist of applying compressed air at a predetermined pressure to one external port of a HCU 15 and exercising the various components or subassemblies contained therein while monitoring air pressure at another external port. For the following tests, maximum and minimum limits for the monitored air pressure have been determined for the HCU components being tested. Test results which fall within these limits are indicative that the individual components and the assembled HCU will provide reliable hydraulic service.

Because an ABS is normally operated with hydraulic fluid, the control unit tolerances are not as tight as would be required for operation with compressed air. Thus, when control valves are tested with compressed air, a small amount of air leakage from the unit and within the unit is expected. The amount of air leakage is determined by measuring the rate of air flow into the HCU 15 at various points in the test. For the following tests, maximum limits for flow rates have been determined for the HCU components being tested. Test results which fall below these limits are indicative that the individual components and the assembled HCU will provide reliable hydraulic service.

While the testing is described in terms of the HCU 15 illustrated in FIG. 1, the tests are equally applicable to other ABS and TCS configurations.

Figure 2:
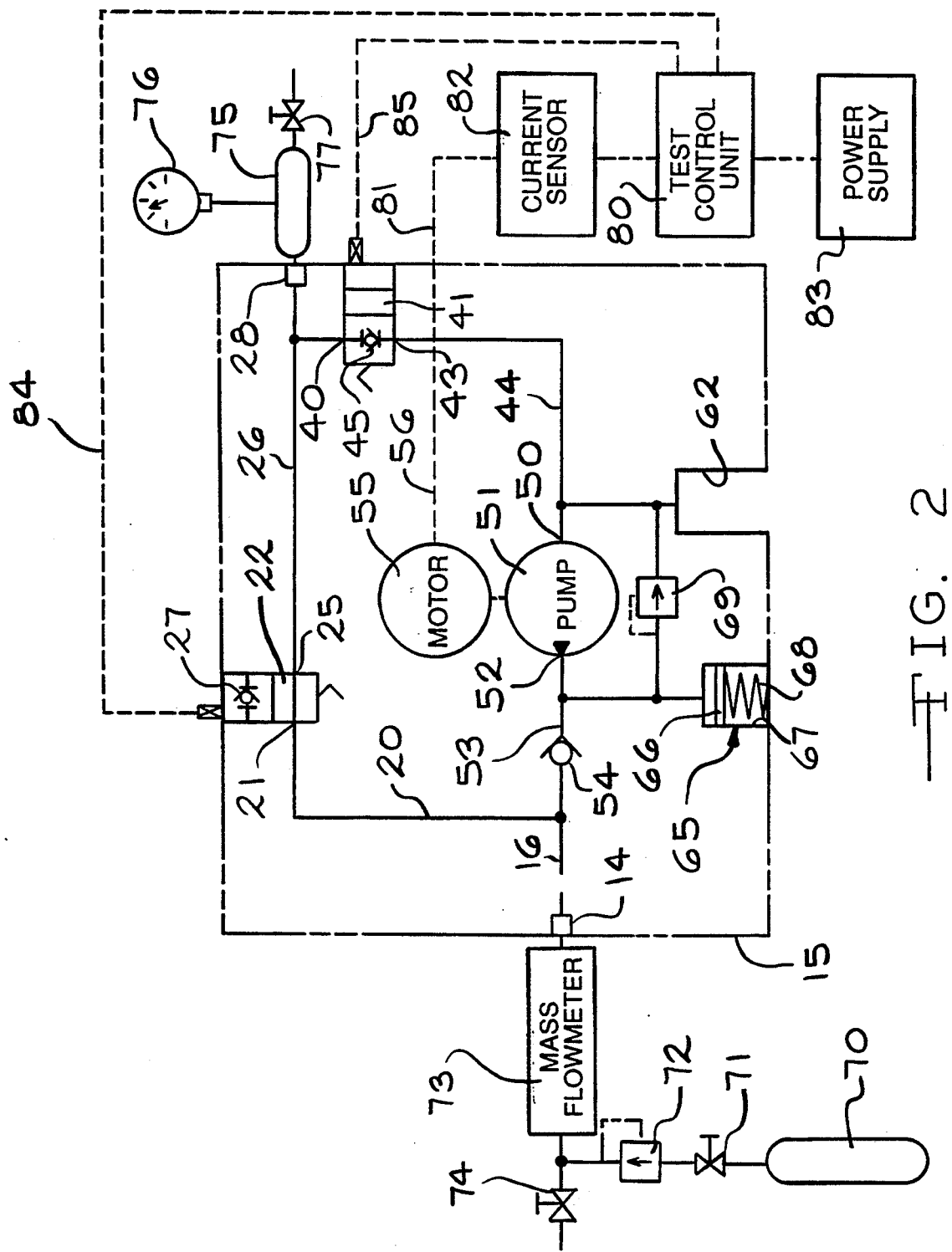
FIG. 2 is a schematic diagram illustrating a functional valve test for the hydraulic control unit shown in FIG. 1 in accordance with the invention.

Referring now to FIG. 2, there is illustrated pneumatic test equipment connected to the HCU 15 shown in FIG. 1 in accordance with the invention. The test equipment configuration shown in FIG. 2 is utilized for function and leak testing of the isolation and dump valves 22 and 41. Components shown in FIG. 2 which also appear in FIG. 1 are numbered the same.

A compressed air supply 70 is connected through a supply shut off valve 71 and an adjustable pressure regulator 72 to an inlet port of a mass flowmeter 73. While the test method is described as having compressed air for the test medium, other gases can be used. The method can use an inert gas, a mixture of two or more inert gases, or a mixture of of air and one or more inert gases.

The mass flowmeter 73 has an outlet port connected to the master cylinder port 14 of the HCU 15. The mass flowmeter 73 is a commercially available device which measures the rate at which compressed air enters the HCU 15. A first vent valve 74 is included between the pressure regulator 72 and the mass flowmeter 73 as a means for venting compressed air from the HCU to the atmosphere.

A fixed volume manifold 75 is connected to the brake port 28 of the HCU 15. A pressure sensor 76 is attached to the manifold 75 for monitoring the manifold air pressure which is identical to the air pressure at the brake port 28. While a pressure gauge is shown in FIG. 2 for the pressure sensor 76, other devices can be used. For example, a pressure transducer and microprocessor can be connected to the manifold 75 to sense and record the brake port gas pressure as a function of time. A second vent valve 77 is connected to the manifold 75 to allow venting of the compressed air from the manifold 75 and the HCU 15 to the atmosphere. While manual shut off and vent valves 71, 74 and 77 have been shown in FIG. 2, the valves can be solenoid actuated and remotely controlled by a central Test Control Unit (TCU) 80. The TCU 80 can be a modified ABS CCU or a microprocessor which is programmed to carry out the functional testing.

The pump motor 55 is connected by electrical connectors 56 and 81, shown as a dashed line in FIG. 2, through a means for sensing motor current 82 and the TCU 80 to a power supply 83. The means for sensing motor current 82 is conventional in the art and measures current magnitude. The test controller is also connected through electrical connectors 84 and 85 to the solenoid coils of the apply and dump valves 22 and 41, respectively. As will be described below, the TCU 80 selectively energizes the solenoid valves 22 and 41 and pump motor 55.

Prior to starting testing, the isolation valve 22, dump valve 41, pump 51 and motor 55 assembly, high and low pressure accumulators 60 and 65 and relief valve 69 are preassembled as subassemblies separate from the HCU valve body. Each subassembly must successfully pass an individual functional test prior to installation in the HCU valve body. All the subassemblies except the low pressure accumulator 80 are installed in the HCU valve body. The low pressure accumulator 60 is omitted to allow the dump valve 41 to vent through the brake discharge passageway 44 and the low pressure accumulator bore 62 to atmosphere.

Figure 3A:
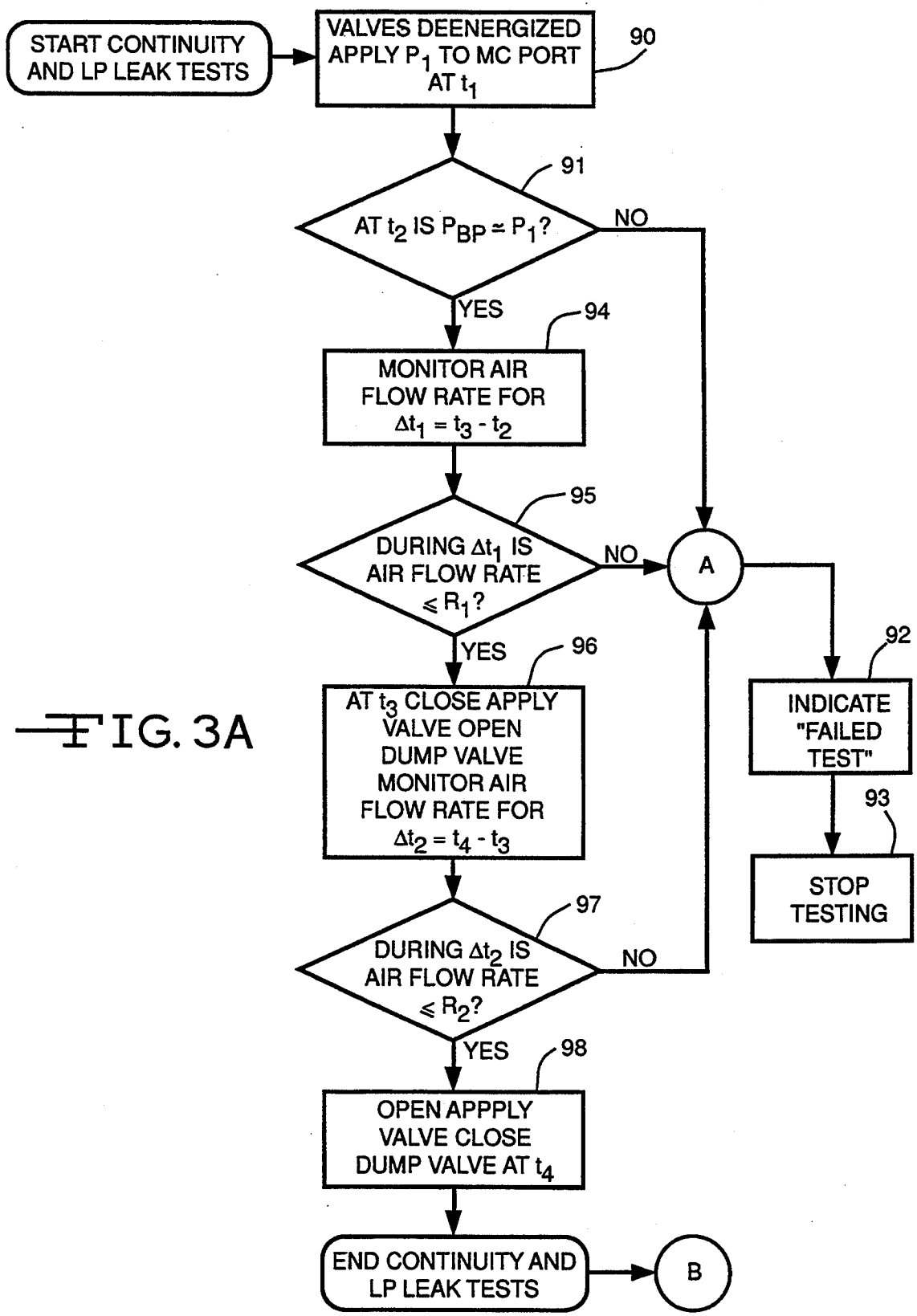
FIGS. 3A through 3D are flow charts for the functional valve test illustrated in FIG. 2.

Functional testing of the HCU 15 according to the test method of the present invention is initiated with a valve continuity and low pressure leak test as illustrated by the flow diagram in FIG. 3A. The valve continuity and low pressure leak test verifies that the apply and dump valves 22 and 41 have been correctly installed and are functional. As shown in functional block 90 in FIG. 3A, at time $t_1$, both the valves are deenergized, allowing the apply valve 22 to be open and the dump valve 41 to be closed, and compressed air at a relatively low pressure $P_1$ is applied to the master cylinder port 14. The compressed air flows through the inlet, master cylinder and intermediate passageways 16, 20 and 26 to the brake port 28 and into the manifold 75. The brake port pressure, $P_{BP}$, is monitored with the pressure sensor 76. $P_{BP}$ should increase to approximately the value of $P_1$, as shown in the brake port pressure/time diagram of FIG. 4. To satisfy the criteria of being approximately equal, $P_{BP}$ must be within a range of predetermined pressures by time $t_2$ for the test to proceed. The predetermined pressure range includes the pressure $P_1$ as an upper bound and is derived for the particular test. This same decision criteria is used throughout the test method when a decision block in a flow diagram indicates that a measured pressure must be approximately equal to a predetermined pressure.

At $t_2$, $P_{BP}$ is compared to the predetermined pressure range as shown in decision block 91. If $P_{BP}$ is outside the range, the test is aborted with a "failed test" indication given in functional block 92 and the testing sequence halted in functional block 93. If $P_{BP}$ is within the acceptable pressure range, this confirms that the apply valve 22 is open and the dump valve 41 is closed.

The test method continues to functional block 94 where the air flow rate measured by the mass flowmeter 73 is monitored for a predetermined period of time $\Delta t_1 = t_3 - t_2$. The air flow rate is an indication of leakage through the dump valve 41, or other HCU components. At decision block 95, the air flow rate during $\Delta t_1$ is compared to a predetermined value $R_1$. If the air flow rate exceeds $R_1$ at any time during $\Delta t_1$, the test is aborted.

Figure 4:
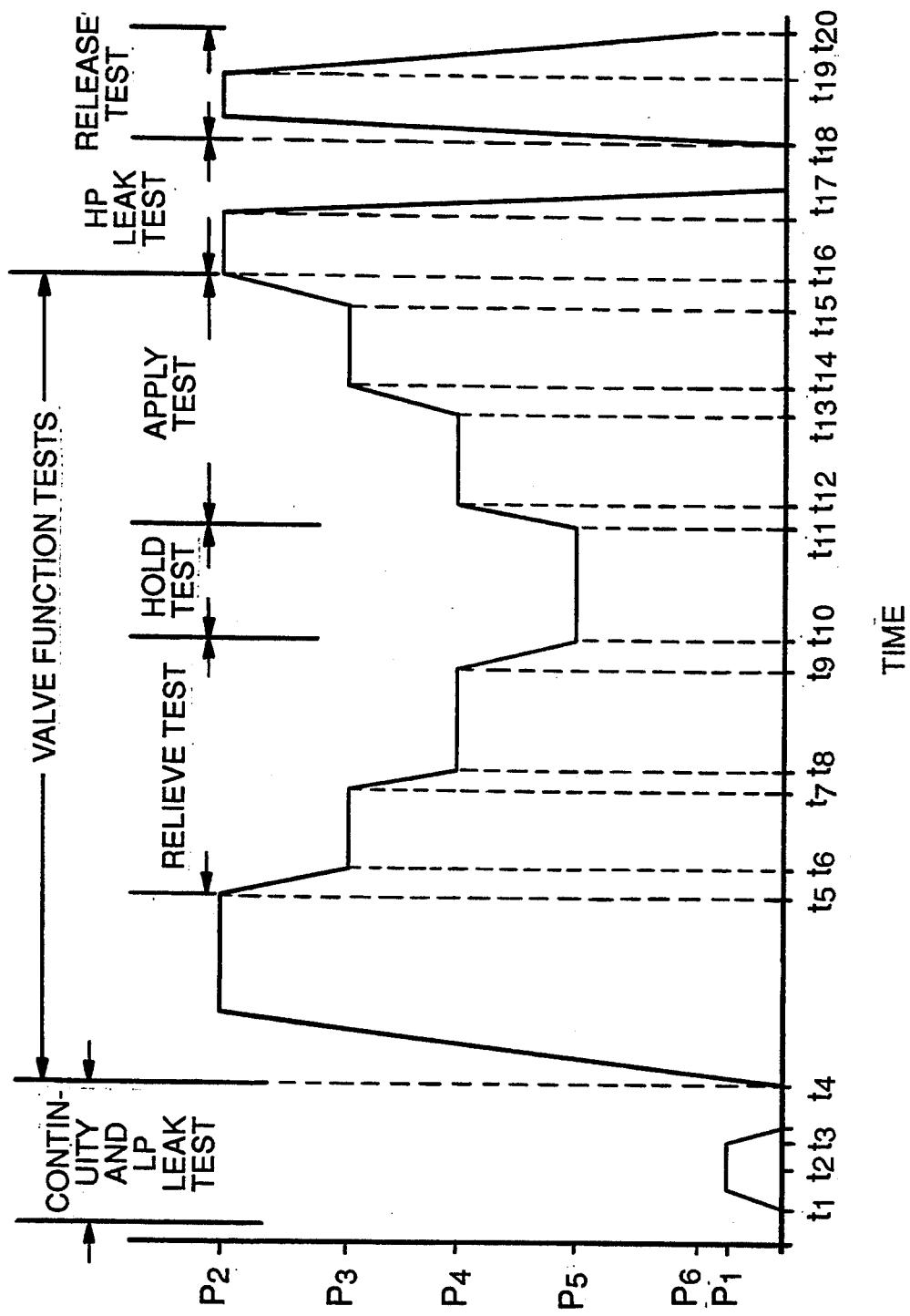
FIG. 4 is a pressure/time diagram for the tests illustrated in FIGS. 3A through 3D.

If the air flow rate is satisfactory, the test proceeds at $t_3$ to functional block 96 where the apply valve 22 is closed and the dump valve 41 opened. Closing the apply valve 22 blocks the compressed air supply 70. Opening the dump valve 41 vents the compressed air contained in the intermediate passageway 26 and manifold 75 through the brake discharge passageway 44 and low pressure accumulator bore 62 to atmosphere. As seen in FIG. 4, $P_{BP}$ drops to atmospheric pressure. Again, the air flow rate measured by the mass flowmeter 73 is monitored for a predetermined time period $\Delta t_2 = t_4 - t_3$. The time period $\Delta t_2$ can be the same as, or different from, the time period $\Delta t_1$. The air flow rate during the time period $\Delta t_2$ is an indication of leakage through the apply valve 22 and, as shown in decision block 97, cannot exceed a predetermined rate $R_2$ at any time during $\Delta t_2$. If the air flow rate exceeds $R_2$, the test is aborted. If the air flow rate is satisfactory, the continuity and low pressure leak test is concluded at $t_4$, as shown in functional block 98, when the apply valve 22 is opened and the dump valve 41 closed.

Figure 3B:
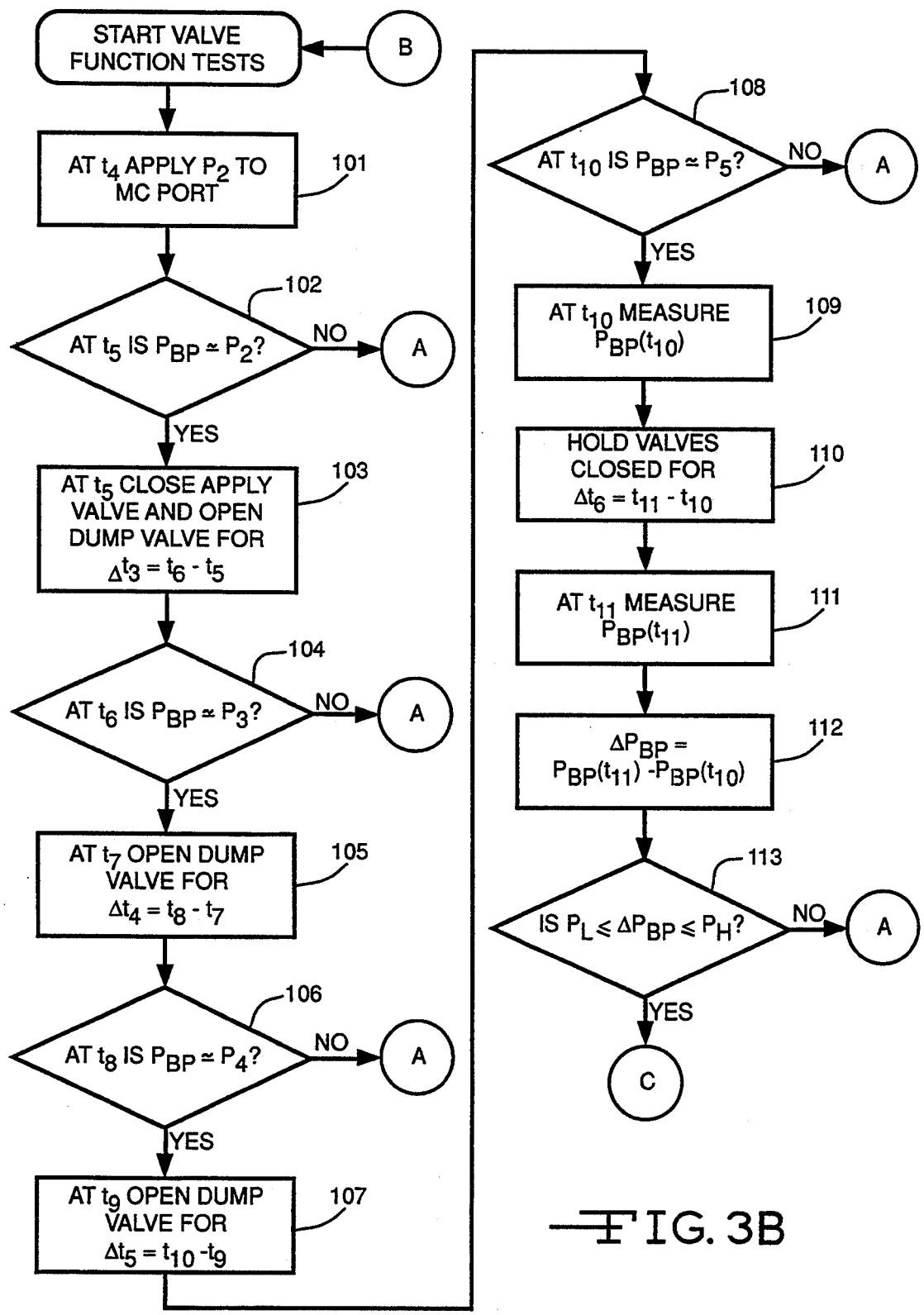
Figure 3C:
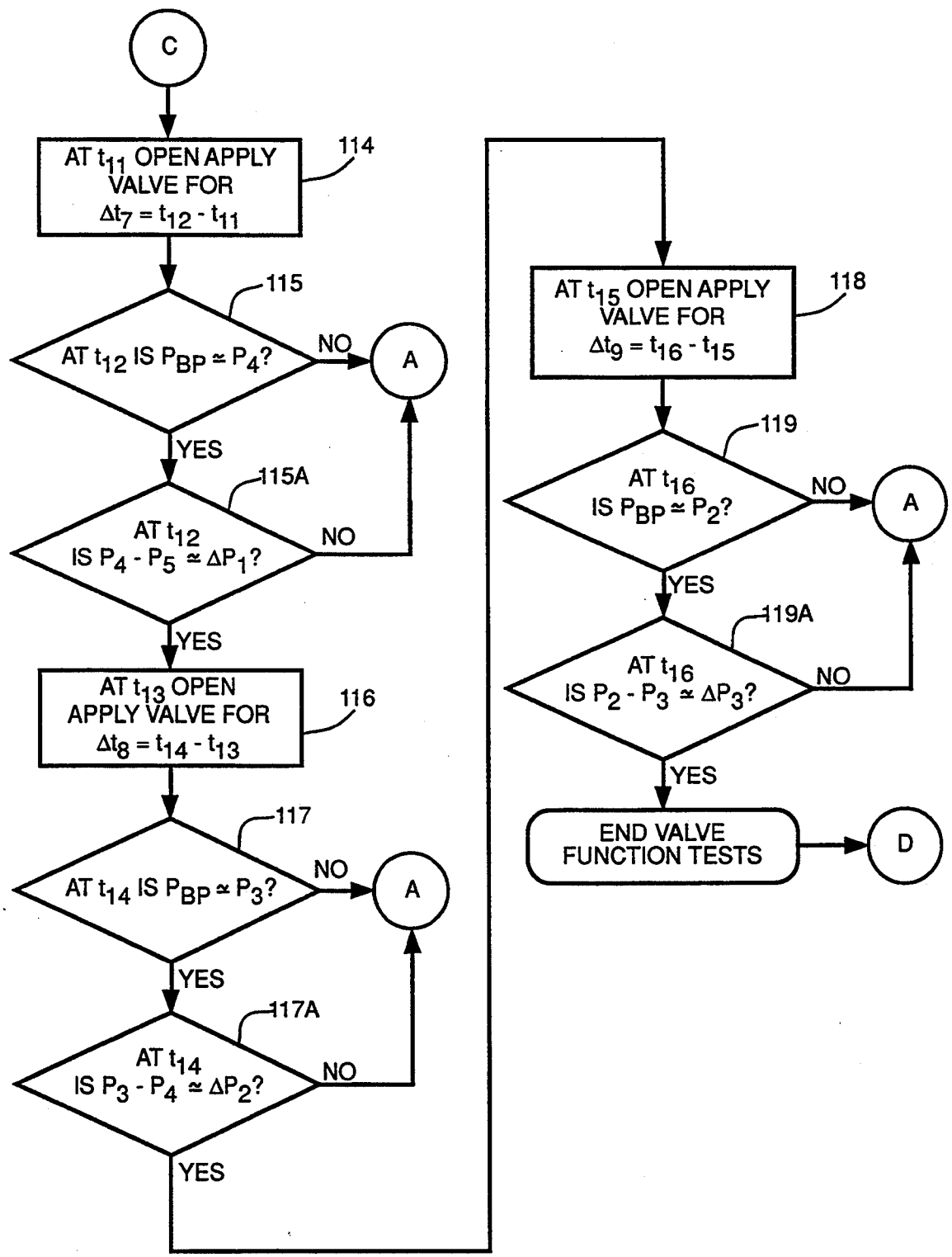

The functional testing of the HCU 15 is continued with valve function tests as illustrated by the flow diagrams in FIGS. 3B and 3C. The valve function tests begin at $t_4$ with application of compressed air at a moderately high pressure $P_2$ to the master cylinder port 14, as shown in functional block 101 of FIG. 3B. Because the apply valve 22 is open and the dump valve 41 is closed, the compressed air charges the master cylinder and intermediate passageways 20 and 26 in the HCU 15 and the manifold 75. Thus the pressure at the brake port 28, $P_{BP}$, as indicated on the pressure sensor 75, rises. At $t_5$, $P_{BP}$ must be approximately equal to to $P_2$ for the test to continue. If $P_{BP}$ is not approximately equal to to $P_2$, the test is aborted as described above.

If $P_{BP}$ is acceptable, the valve function tests continue to functional block 103 where a relieve test begins. The relieve test is a functional test of the capability of the dump valve 41 to provide a controlled reduction of pressure at the brake port 28. At time $t_5$, in functional block 103, the apply valve 22 is closed and remains closed throughout the relieve test. Closing the apply valve blocks communication between the supply of compressed air 70 and the combined volumes of the intermediate passageway 26 and the manifold 75. The dump valve 41 is then opened for a predetermined time period $\Delta t_3 = t_6 - t_5$. Opening the dump valve 41 bleeds air from the intermediate passageway 26 and the manifold 75 through the brake discharge passageway 44 and the low pressure accumulator bore 62 to the atmosphere. This results in a decrease in $P_{BP}$.

As shown in decision block 104, at $t_6$, $P_{BP}$ must be approximately equal to a predetermined pressure $P_3$ for the test to continue. In functional blocks 105 through 108 in FIG. 3B and in the pressure/time diagram of FIG. 4, the dump valve is again opened for a short period of time at $t_7$ and $t_9$ to reduce $P_{BP}$ to approximately $P_4$ and $P_5$, respectively. The amount of decrease of $P_{BP}$ at each step of the relieve test is a function of the length of time the valve is opened, the dump valve orifice size, the armature travel distance and the manifold volume. Thus, the relieve test demonstrates that the dump valve 22 is correctly installed, that the valve orifice is correctly sized and that the valve armature is moving the correct distance when the valve operates. While three pressure reductions are shown in FIGS. 3B and 4, the relieve test can have any number of pressure reductions.

The valve function tests continue with a hold test which demonstrates the capability of the HCU 15 to maintain a predetermined pressure at the brake port 28. At $t_{10}$, $P_{BP}$ is measured with the pressure sensor 76 to determine $P_{BP}(t_{10})$, as shown in functional block 109 of FIG. 3B. In functional block 110, both the apply and dump valves 22 and 41 are held closed for a time period $\Delta t_6 = t_{11} - t_{10}$ to retain the compressed air present in the intermediate passageway 26 and the manifold 75. Then, in functional block 111, at $t_{11}$, $P_{BP}$ is again measured with the pressure sensor 76 to determine $P_{BP}(t_{11})$. The change in $P_{BP}$, $\Delta P_{BP}$, during the time period $\Delta t_6$, is calculated in functional block 112. $\Delta P_{BP}$ must be within a predetermined pressure range, as shown in decision block 113 for the test to continue. The pressure range for acceptability is defined by low and high values $P_L$ and $P_H$, respectively, which are derived for the particular HCU being tested. If $\Delta P_{BP}$ is outside of the pressure range for acceptability, the test is aborted as described above.

If $\Delta P_{BP}$ is within the acceptable pressure range, the valve function tests continue to functional block 114 in FIG. 3C where an apply test begins. The apply test is a test. At time $t_{11}$, in functional block 114, the apply functional test of the capability of the apply valve 22 to provide a controlled increase of pressure at the brake port 28. The dump valve 41 remains closed throughout the apply test. At time $t_{11}$, in functional block 114, the apply valve 22 is opened for a predetermined time period $\Delta t_7 = t_{12} - t_{11}$. Opening the apply valve 22 bleeds compressed air from the master cylinder passageway 20 through the apply valve orifice and into the the intermediate passageway 26 and manifold 75. This results in an increase in $P_{BP}$.

As shown in decision block 115, at $t_{12}$, $P_{BP}$ must be approximately equal to a predetermined pressure $P_4$ for the test to continue. An alternate test criteria as shown in decision block 115A, wherein the change in pressure from $P_4$ to $P_5$ must be approximately equal to a predetermined value $\Delta P_1$. Either or both of the test criteria shown in decision blocks 115 and 115A can be used to demonstrate satisfactory operation of the apply valve 22. In functional blocks 116 through 119A in FIG. 3C and in the pressure/time diagram of FIG. 4, the apply valve is again opened for a short period of time at $t_{13}$ and $t_{15}$, respectively. This increases $P_{BP}$ to approximately $P_3$ at $t_{14}$ and $P_2$ at $t_{16}$, respectively, with corresponding pressure increases of $\Delta P_2$ and $\Delta P_3$. The amount of increase of $P_{BP}$ at each step of the apply test is a function of length of time that the valve is opened, the apply valve orifice size, the armature travel distance and the manifold volume. Thus, the apply test demonstrates that the apply valve 22 is correctly installed, that the valve orifice is correctly sized and that the valve armature is moving the correct distance when the valve operates. While three pressure increases are shown in FIGS. 3B and 4, the apply test can have any number of pressure increases.

Upon $P_{BP}$ returning to a value of approximately $P_2$, the valve function tests are completed. The length of time that each valve is opened and the specific pressure levels used are derived for the specific HCU being tested. For simplicity of illustration, the same intermediate pressures and number of pressure steps were used for both the relieve and apply tests in the above discussion. In other embodiments of the the test method, different pressures and number of steps can be used. Furthermore, the time periods between opening of the apply and dump valves 22 and 41 can be equal or can vary in length.

Figure 3D:
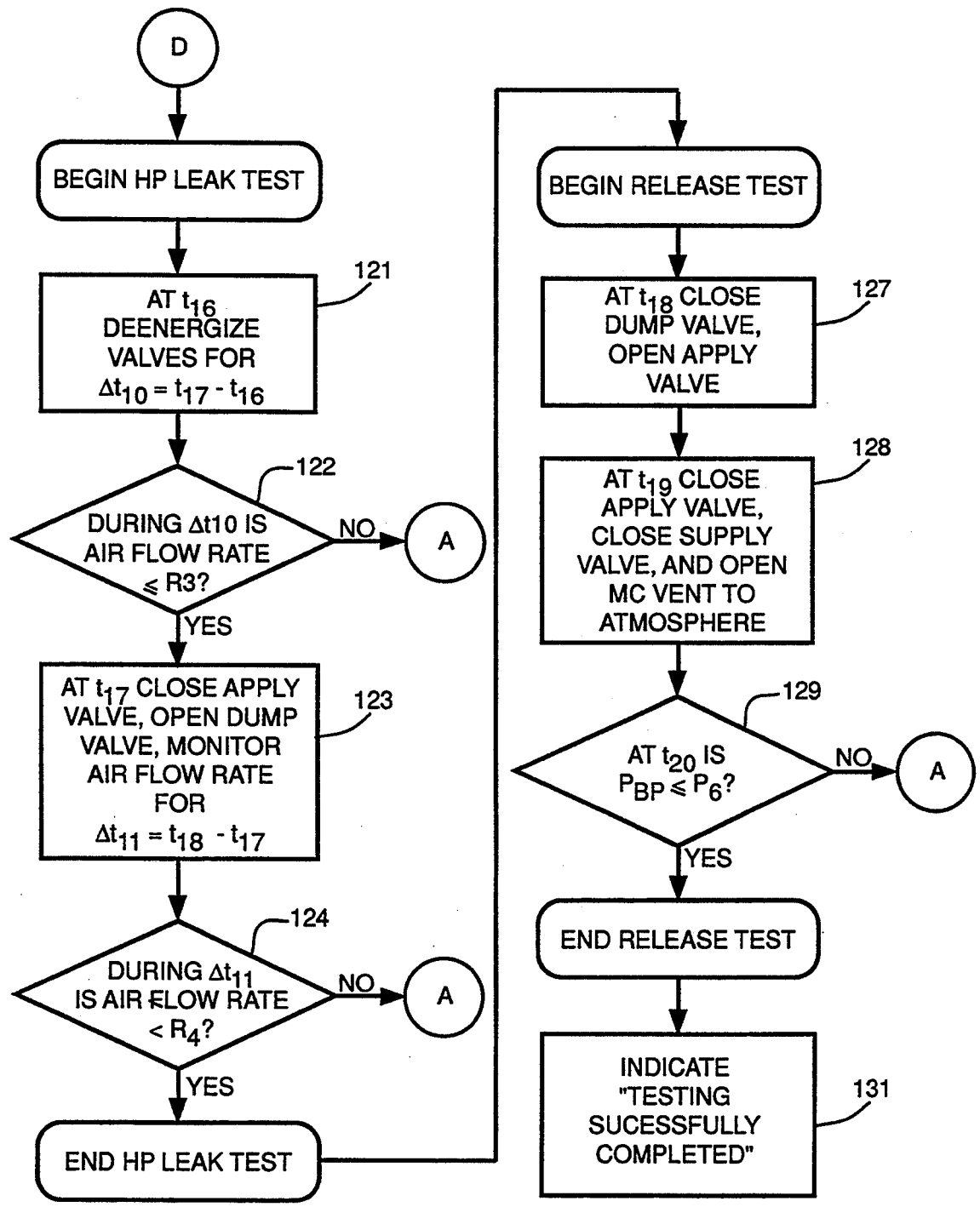

The HCU testing continues with a high pressure leak test as illustrated in the flow chart in FIG. 3D. As shown in functional block 121, at $t_{16}$, both valves are deenergized to open the apply valve 22 and close the dump valve 41. The air flow rate measured with the mass flowmeter 73 is monitored for a predetermined time period $\Delta t_{10} = t_{17} - t_{16}$ to determine leakage through the dump valve 41. As shown in decision block 122, the air flow rate must not exceed a predetermined rate $R_3$, which is specified for the particular HCU being tested. If $R_3$ is exceeded, the test is aborted.

If successful, the high pressure leak test continues with closure of the apply valve 22 and opening of the dump valve 41 at $t_{17}$, as shown in functional block 123. The air flow rate measured with the mass flowmeter 73 is monitored for a predetermined time period $\Delta t_{11} = t_{18} - t_{17}$ to determine leakage through the apply valve 22. As shown in decision block 124, the air flow rate must not exceed a predetermined rate $R_4$. If $R_4$ is exceeded, the test is aborted. If successful, the high pressure leak test is concluded and a release test started.

The release test confirms operation of the apply valve internal check valve 27. The release test begins at $t_{18}$ by closing the dump valve and opening the apply valve, as shown in functional block 127. This valve action raises $P_{BP}$ to $P_2$, as illustrated in FIG. 4. At $t_{19}$, both the apply valve 22 and the supply shut off valve 71 are closed. Then the first vent valve 74 is opened, as shown in functional block 128, opening the master cylinder port 14 to the atmosphere. Under these conditions, the pressure of the compressed air contained within the combined volumes of the intermediate passageway 26 and the manifold 75 causes the check valve 27 to open which vents the compressed air to the atmosphere. The venting of the compressed air lowers the pressure indicated on the pressure sensor 76. As shown in decision block 129, at $t_{20}$, the $P_{BP}$ is compared to a predetermined pressure $P_6$. If $P_6$ is exceeded, it is an indication that the check valve 27 is malfunctioning and the test is aborted. If $P_6$ is not exceeded, the release test is successfully completed and the testing ends with a "Testing Successfully Completed" indication as shown in functional block 131. This concludes the valve function and leak testing using the test equipment configuration illustrated in FIG. 2

Figure 5:
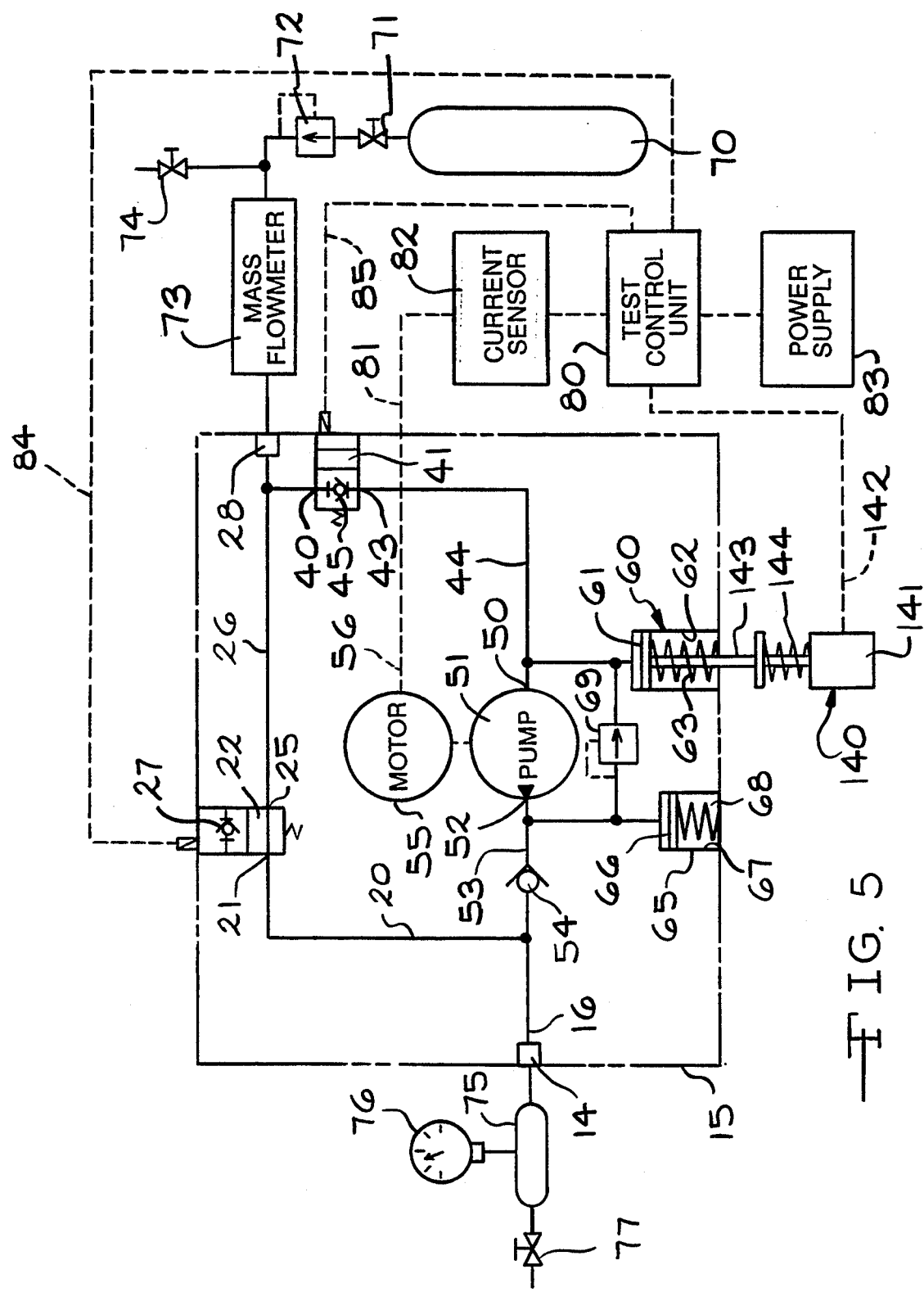
FIG. 5 is a schematic diagram illustrating functional accumulator and pump testing for the hydraulic control unit shown in FIG. 1 in accordance with the invention.

Further testing according to the test method includes accumulator and pump functional testing. Before starting the accumulator and pump testing, the Low Pressure Accumulator (LPA) subassembly 60 is installed in the HCU 15 to form a complete control unit. The test equipment is connected to the complete HCU 15 as illustrated in FIG. 5. As shown in FIG. 5, the supply of compressed air 70 is now connected through the shut off valve 71, the pressure regulator 72 and the mass flowmeter 73 to the brake port 28. The manifold 75 is connected to the master cylinder port 14. Thus, in the following tests, compressed air is applied to the brake port 28 while air pressure is measured at the master cylinder port 14.

The test configuration shown in FIG. 5 includes a displacement sensor 140 for measuring the movement of the LPA plunger 61. The displacement sensor 140 includes a transducer 141 connected by an electrical connector 142 to the TCU 80. The displacement sensor 140 includes a movable probe 143 which can be inserted through an aperture (not shown) formed through the base of the LPA. When so inserted, the probe 143 extends into the LPA bore 62 and contacts the outer surface of the LPA plunger 61. A bias spring 144 maintains the contact between the end of the probe 143 and the plunger 61 without restricting plunger movement. As the plunger 61 shifts within the bore 62, the the probe 143 is displaced, causing the transducer 141 to generate a displacement signal proportional to the distance shifted. The displacement signal is transmitted to the TCU 80.

Figure 6A:
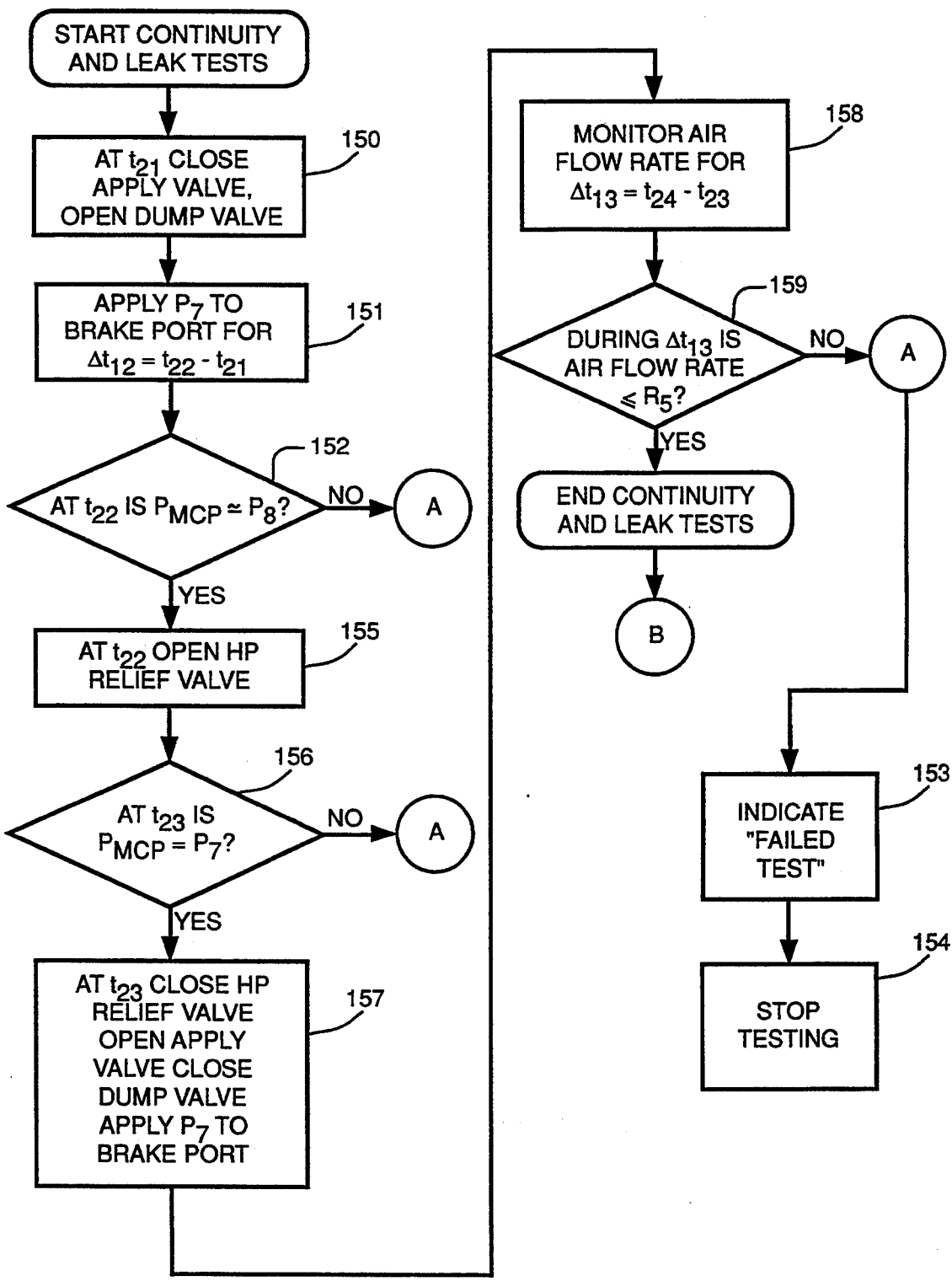
FIGS. 6A through 6D are flow charts for the testing illustrated in FIG. 5.
Figure 7:
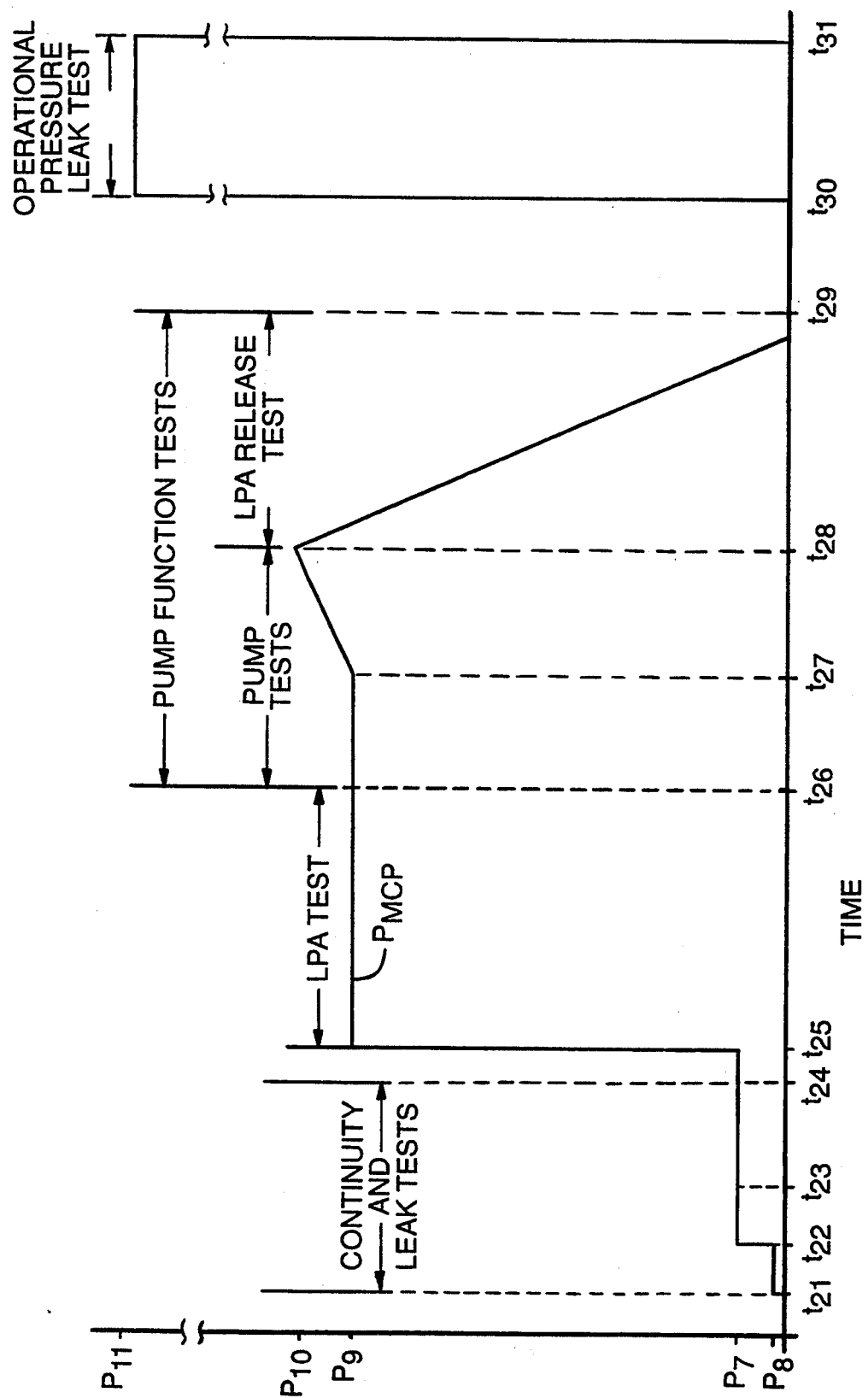
FIG. 7 is a pressure/time diagram for the tests illustrated in FIGS. 6A through 6D.

The accumulator and pump functional testing begins with a continuity and low pressure leak test as illustrated in the flow diagram in FIG. 6A and the pressure/time diagram in FIG. 7. The continuity and leak test verifies that the LPA is installed properly and that the test equipment is correctly connected and functioning.

As shown in functional block 150 in FIG. 6A, at time $t_{21}$, the apply valve 22 is closed and the dump valve 41 is opened. At functional block 151, compressed air at a relatively low pressure $P_7$ is applied to the brake port 28. The pressure $P_7$ is sufficiently low that the first check valve 27 does not open. With the apply valve 22 closed and the dump valve 41 open, compressed air flows into the intermediate and brake discharge passageways 26 and 44, but is blocked from entering the inlet or master cylinder passageways 16 and 20. The master cylinder port pressure, $P_{MCP}$, is monitored with the pressure sensor 76 mounted upon the manifold 75 and increases slightly due to air leakage through the apply valve 22 and other components of the HCU 15. As shown in decision block 152, at $t_{22}$, $P_{MCP}$ must not exceed a predetermined pressure, $P_8$. If $P_{MCP}$ exceeds $P_8$, the test is aborted by transfer to the functional block 153 which causes a "Failed Test" indication to be displayed and then to functional block 154 where the testing is stopped.

If $P_{MCP}$ does not exceed $P_8$, the test continues to functional block 155 where, at $t_{22}$, the high pressure relief valve 69 is opened. If a combined high pressure accumulator and relief valve assembly is used, the relief valve 69 is opened by inserting a stiff probe (not shown) into an aperture formed in the base of the high pressure accumulator 65. The stiff probe axially shifts an inner plunger (not shown) to lift the high pressure relief valve 69 from its valve seat (not shown). Opening the high pressure relief valve 69 allows compressed air to flow through the pump discharge passageway 53, through the second relief valve 54 and into the inlet and master cylinder passageways 16 and 20 and the manifold 75. Operation of the high pressure relief valve 69 is verified in decision block 156 where $P_{MCP}$ must be approximately equal to $P_7$ for the test to continue. If $P_{MCP}$ is not approximately equal to $P_7$, the test is aborted.

If successful, the test continues, as shown in functional block 157, where, at $t_{23}$, the high pressure relief valve 69 is closed, the apply valve 22 is opened and the dump valve 41 is closed. This maintains communication between the intermediate passageway 26 and the master cylinder and inlet passageways 20 and 16 and the manifold 75. The air flow rate into the brake port 28 as measured by the mass flow meter 73 is monitored in functional block 158 for a time period $\Delta t_{13} = t_{24} - t_{23}$ to determine HCU leakage. As shown in decision block 159, the air flow rate must not exceed a predetermined rate $R_5$ for the test to continue. $R_5$ is determined for the particular HCU being tested. Successful completion of leakage test concludes the continuity and leak test.

Figure 6B:
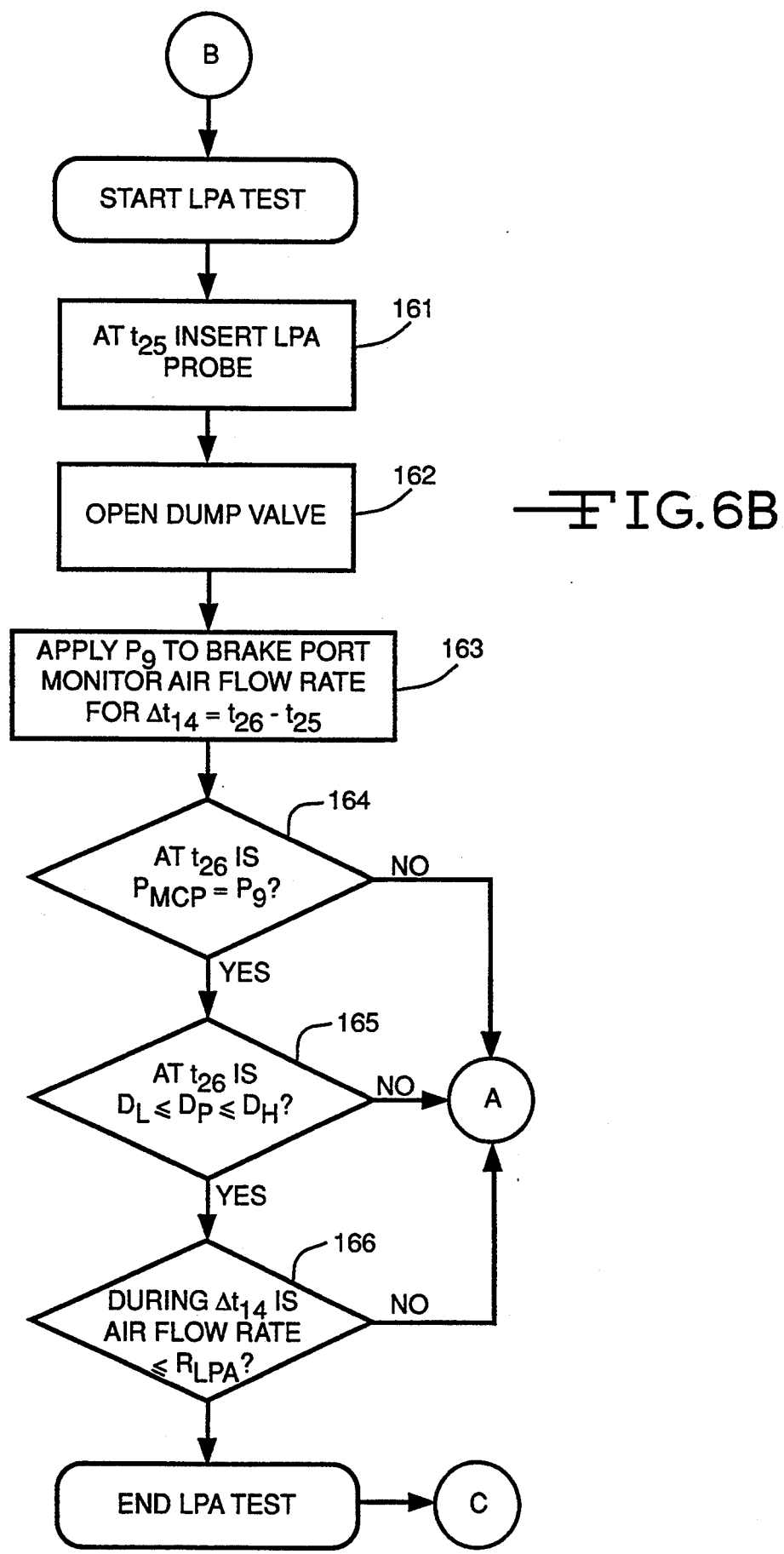

The testing continues with the LPA test shown in the flow diagram in FIG. 6B. As shown in functional block 161, at $t_{25}$, the displacement sensor probe 143 is inserted into the LPA 60 to establish a zero displacement reference. Then the dump valve 41 is opened, as shown in functional block 162. Compressed air having a moderately high pressure $P_9$ is applied to the brake port in functional block 163 for a time period $\Delta t_{14} = t_{26} - t_{25}$ during which the air flow rate is monitored with the mass flowmeter 76.

With the dump valve 41 open, the compressed air flows through the brake discharge passageway 44 and into the LPA 60. $P_9$ is sufficiently high to displace the plunger 61 within the bore 62, compressing the LPA bias spring 63. As described above, the plunger movement shifts the probe 143 causing the transducer 141 to generate a displacement signal for the TCU 80.

At $t_{26}$, the $P_{MCP}$ is measured and must be approximately equal to $P_9$ for the test to continue. Also at $t_{26}$, the displacement of the LPA plunger 61, $D_P$, as measured by the displacement sensor 140 is compared to a range of predetermined expected displacement values, as shown in decision block 165. The range is determined for the specific HCU being tested. If $D_P$ is outside the range, the test is aborted. Finally, in decision block 166, the air flow rate must not have exceeded a predetermined rate $R_{LPA}$ during $\Delta t_{14}$ for the test to be successful. Upon successfully completing the air flow rate check, the LPA test is concluded.

Figure 6C:
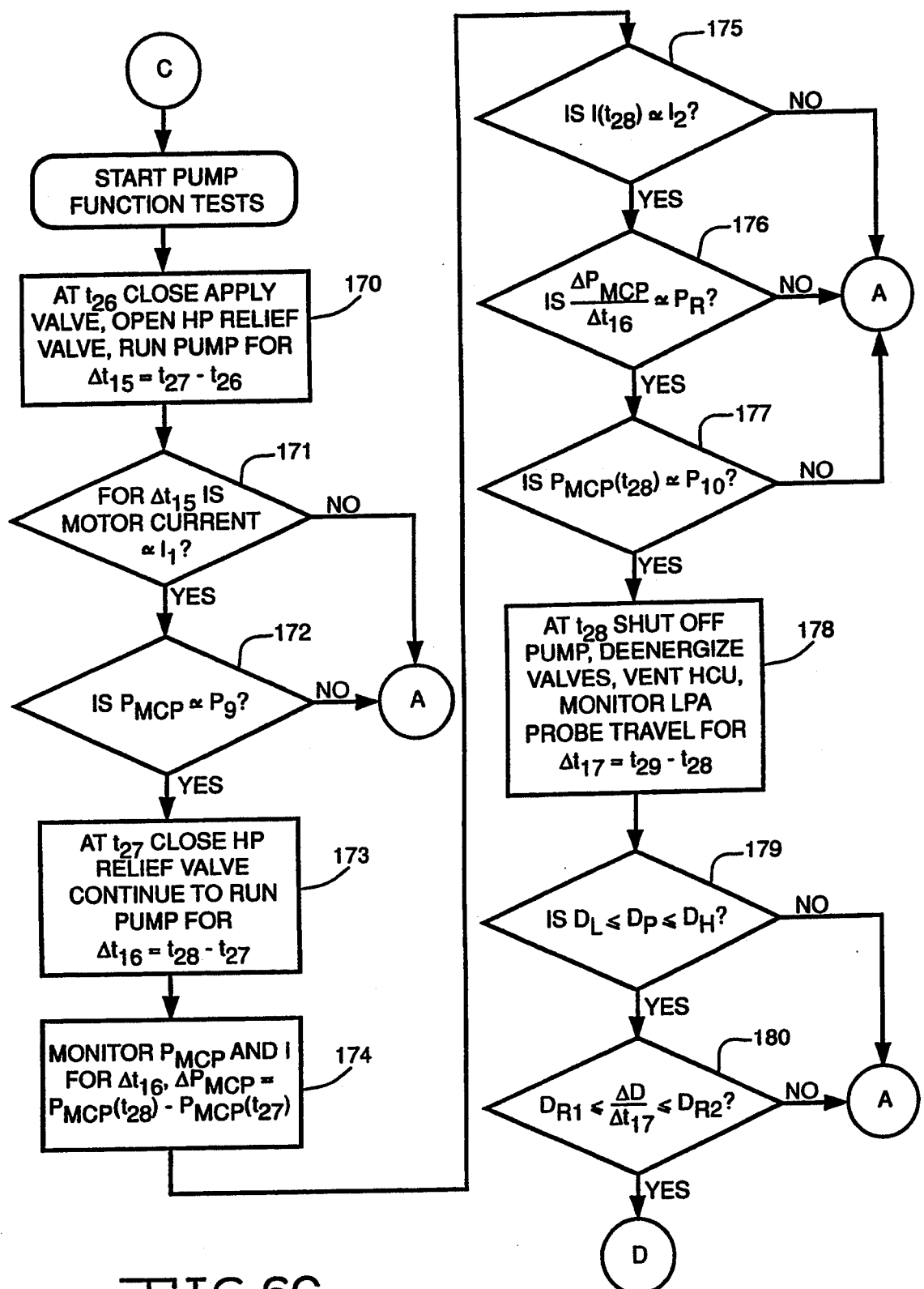

The testing continues with the pump function tests illustrated in the flow chart shown in FIG. 6C. As shown in functional block 170, at $t_{26}$, the apply valve 22 is closed, the high pressure relief valve 69 is again opened and the pump 51 started. As the pump 51 operates, the current drawn by the pump motor 55 is monitored by the means for sensing current. The pump 51 is operated with the relief valve 69 held open for a predetermined time period $\Delta t_{15} = t_{27} - t_{26}$.

While positive displacement pumps are normally used to pump incompressible fluids, such pumps will also pump a compressible gas when the gas is supplied under pressure to the pump inlet port 50. Thus, the pump 51 pumps compressed air from the brake discharge passageway 44 into the pump discharge passageway 53. However, with the high pressure relief valve 69 open, the pumped air will return therethrough to the brake discharge passageway 44. Thus, the compressed air is merely recirculated within the HCU 15 by the pump 51, and the manifold pressure remains the same, as shown in FIG. 7. This indicates that the pressure relief valve 69 is open. As shown in decision block 171, the current, I, drawn by the pump motor 55 must be approximately equal to a predetermined value $I_1$ during $t_{15}$ for the test to continue. The motor current must be within a first predetermined range of values which is specified for each particular pump and motor combination. Excessive motor current could indicate a malfunctioning pump 51 or motor 55. Likewise, $P_{MCP}$ is monitored during $\Delta t_{15}$. As shown in decision block 172, $P_{MCP}$ must remain approximately equal to $P_9$ for the test to continue.

As shown in functional block 173, at $t_{27}$, the stiff probe is withdrawn from the high pressure accumulator 65, allowing the high pressure relief valve 69 to close while the pump 51 continues to run for $\Delta t_{16} = t_{28} - t_{27}$. With both the relief valve 69 and the apply valve 22 closed, the pump 51 raises the air pressure in the pump discharge passageway 53 causing the check valve 54 to open. The pump 51 then continues working against a fixed volume defined by the combined volumes of the pump discharge, master cylinder and inlet passageways 53, 20 and 16, and the manifold 75. As the compressed air supply 70 provides pressurized air to the pump intake port 50, the pump 51 pumps the air into the fixed volume. Because the combined volume of the passageways 53, 20 and 16 and manifold 75 is fixed, the air contained therein is further compressed as more air is added. As the air in the fixed volume is compressed, the pressure increases, as shown in FIG. 7. The pressure increase is monitored by the pressure sensor 76 and verifies that the pressure relief valve 69 did close and that the pump 51 is providing a flow of compressed air between the pump intake and discharge ports 51 and 52.

In functional block 174 in FIG. 6C, the pump motor current I is monitored for the time period $\Delta t_{16}$ and the change in $P_{MCP}$ is calculated for the same time period. At $t_{28}$, three test criteria are verified, as shown in decision blocks 175 through 177. In block 175, I must be approximately equal to a predetermined maximum value, $I_2$, for the test to continue. The motor current must be within a second predetermined range of current values which is specified for each particular pump and motor combination. Depending upon the particular motor 55 and pump 51 being tested, the second range of current values can be the same, or different from, the first range of current values described above. In block 176, the rate of increase of $P_{MCP}$ must approximate a predetermined rate $P_R$. Similar to previous tests, the measured rate of pressure increase must fall within an allowable range of values. Finally, $P_{MCP}$, at $t_{28}$, must be approximately equal to a predetermined pressure $P_{10}$. Failure to meet any of these criteria aborts the testing.

The pump function tests are completed with a LPA release test. As shown in functional block 178, at $t_{28}$, the pump 51 is shut off, the compressed air supply shut off valve 71 closed, the apply and dump valves 22 and 41 are deenergized and the vent valves 74 and 77 are opened to vent the HCU 15 to atmosphere. While the dump valve 41 is closed, the dump valve internal check valve 45 opens, providing an exhaust path through the HCU 15 between the LPA 60 and atmosphere. The LPA bias spring 63 expands, urging the LPA plunger 61 back into the bore 62 and forcing the air contained in the LPA 60 through the control unit passageways and into the atmosphere. Failure to do so is indicative of a malfunctioning check valve 45 or a stuck plunger 61. As the plunger 61 moves into the bore 62, the displacement sensor bias spring 144 shifts the probe 143 back into the LPA bore 62 causing the sensor transducer 141 to generate a plunger return signal.

As shown in decision block 179, the LPA plunger 61 must return to a specified position within the bore 62 to demonstrate satisfactory operation of the LPA 60. The test criteria allows a range of positions from a low value $D_L$ to a high value $D_H$ which are derived for the particular HCU 15 and LPA 60 being tested. Furthermore, the rate of return of the plunger 61 is measured and in decision block 180 must be within specified limits $D_{R1}$ and $D_{R2}$ for acceptance of the control unit. Too low a rate of return can be indicative of a sticking accumulator plunger 61, while to high a rate can be indicative of an incorrect bias spring constant.

For speed and economy, the air pressures used in the tests described above are well below the normal hydraulic operating pressures utilized in brake and traction control systems. Therefore, the testing concludes with an operational pressure leak test using a significantly higher air pressure.

Figure 6D:
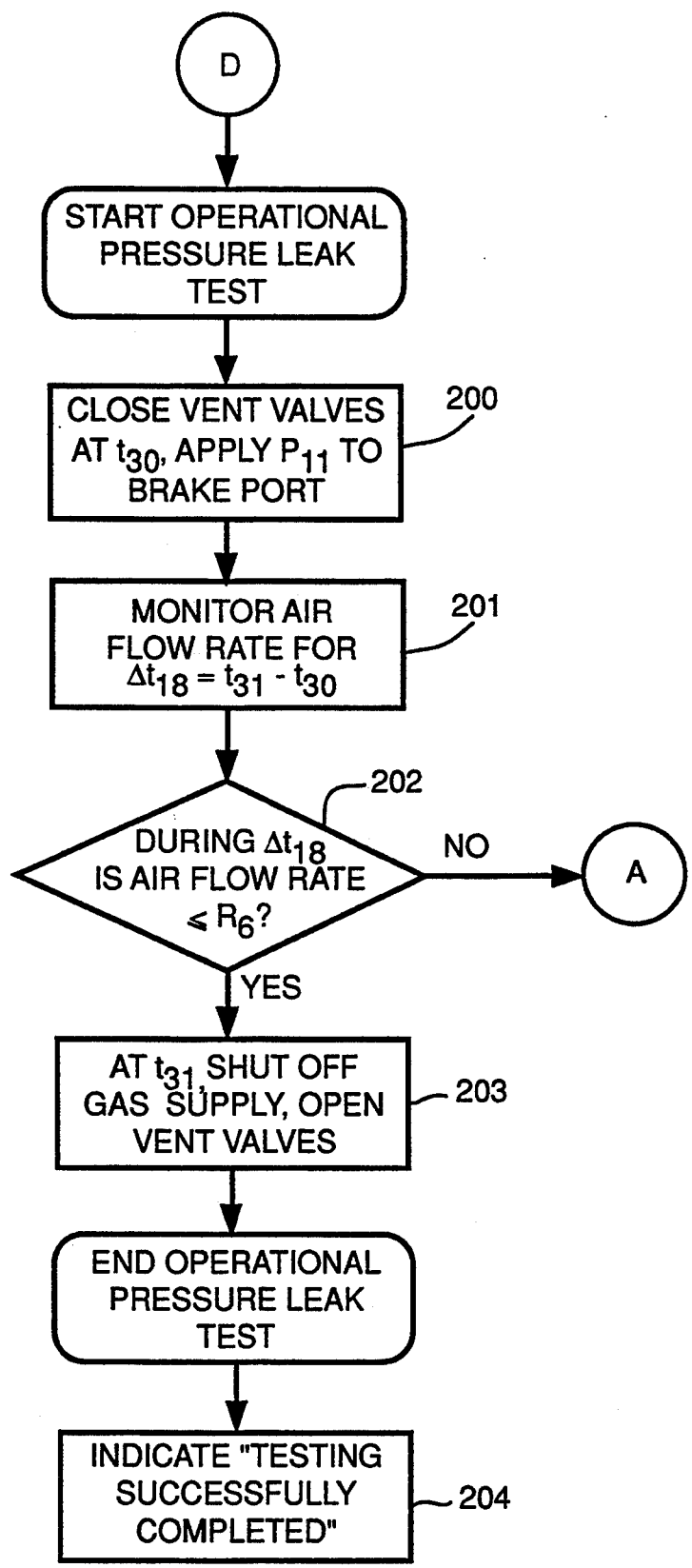

A flow diagram illustrating the operational pressure leak test is shown in FIG. 6D. As shown in functional block 200, the test begins at $t_{30}$ by closing the vent valves 74 and 77, shown in FIG. 5. The pressure regulator 72 is reset to raise the gas pressure applied to the brake port 28 to a very high value, $P_{11}$ shown in FIG. 7. $P_{11}$ is selected to approximate the maximum operational hydraulic pressure the HCU 15 would be subjected to following installation upon a vehicle. The valve 71 is then opened, applying compressed air having a pressure of $P_{11}$ to the HCU 11. Because the apply valve 22 is open, $P_{11}$ appears at the master cylinder port 14 and is indicated on the pressure sensor 76, as shown in FIG. 7.

The air flow rate into the HCU 15 is monitored, as shown in functional block 201, by the mass flowmeter 73 for a predetermined time period $\Delta t_{18} = t_{31} - t_{30}$. The magnitude of the air flow is indicative of the amount of leakage from the HCU 15. In decision block 202, the air flow rate is compared to a predetermined value $R_6$. If the air flow rate equals or exceeds $R_6$ at any time during $\Delta t_{18}$, the test is aborted.

If the air flow rate remains less than $R_6$ during $\Delta t_{18}$, the test continues to functional block 203, where, at $t_{31}$, the air supply 70 is shut off and vent valves 74 and 77 opened. This ends both the high pressure leak test and the functional testing of the HCU 15. A "testing successfully completed" indication is given in functional block 204.

While the operational pressure leak test has been described as using compressed air, other compressed gases can be used. The test can be carried out using an inert gas, a mixture of two or more inert gases, or a mixture of air and one or more inert gases. For example, an inert gas including a mixture of nitrogen and helium has been successfully used for the operational pressure leak test. When a mixture of nitrogen and helium is used for the inert gas, a ratio of nine parts of nitrogen to one part of helium is typical because of the high cost of helium.

The operational pressure leak test can be applied to the HCU 15 at different points in the testing sequence. For example, the test can occur following the release test shown in FIG. 4, in which case the equipment configuration shown in FIG. 2 would be used.

In accordance with the provisions of the patent statutes the principle and mode of operation of this invention have been described and illustrated in its preferred embodiment. However, it will be understood that this invention may be practiced otherwise than as specifically explained and illustrated without departing from the spirit and scope of the following claims. For example, the ABS being tested may not include a positive displacement pump 51. In such a case, the pump functional testing is omitted. Similarly, the ABS may include multiple wheel brakes and different valve configurations. However, compressed air or compressed inert gases can be successfully utilized to functionally test any of the various assembled control unit configurations. Furthermore, as discussed above, the test method can be applied to traction control systems, other hydraulically operated control systems such as automobile transmissions and individual hydraulic valves.

What is claimed is:

1. A method of testing a hydraulic control unit for controlling the application of pressurized liquid to a hydraulically actuated device, the control unit having an inlet port adapted to be connected to a means for supplying pressurized liquid and an outlet port adapted to be connected to the hydraulically actuated device, the control unit further having valve means connected between the control unit inlet and outlet ports for selectively controlling the liquid pressure at the control unit outlet port and positive displacement liquid pump means having an inlet port communicating with the valve means and a discharge port communicating with the control unit inlet port, the pump means being selectively operable to supply pressurized liquid to the valve means, the test method comprising the steps of:

(a) providing a hydraulic control unit;
(b) providing means for sensing the rate of change of the gas pressure at the inlet port of the hydraulic control unit;
(c) applying a pressurized gas to the outlet port of the hydraulic control unit;
(d) operating the valve means and the pump means in a predetermined sequence to supply pressurized gas to the pump means inlet port; and
(e) simultaneously with step (d), monitoring the rate of change of the gas pressure sensed in step (b) to determine whether the pump means is operable.

2. The test method according to claim 1 wherein step (b) includes providing means for sensing the gas pressure and step (e) includes monitoring the gas pressure sensed in step (b) to determine if the gas pressure at the control unit inlet port exceeds the pressure of the gas applied to the control unit outlet port by a predetermined amount after the pump means has been operated for a predetermined period of time.

3. The test method according to claim 2 wherein the hydraulic control unit further includes a high pressure relief valve having an inlet port connected to the pump means discharge port and an outlet port connected to the pump means inlet port, and wherein step (d) includes opening the relief valve for a predetermined time period.

4. The test method according to claim 2 wherein the pump means is driven by an electric motor and step (b) includes providing a means for sensing the current supplied to the electric motor and step (e) includes monitoring the current sensed in step (b) to determine whether the pump means and electric motor are operable.

5. The test method according to claim 1 wherein step (b) includes connecting a manifold having a fixed volume to the control unit inlet port.

6. The test method according to claim 1 wherein the pressurized gas in step (c) is compressed air.

7. The test method according to claim 1 wherein the pressurized gas in step (c) is an inert gas.

8. The test method according to claim 1 further including the steps of:

(f) providing a means for sensing gas pressure at the outlet port of the hydraulic control unit and means communicating with the valve means for venting the pressurized gas from the control unit;
(g) applying a pressurized gas to the inlet port of the hydraulic control unit;
(h) operating the valve means in a predetermined sequence; and
(i) simultaneously with step (h), monitoring the pressure sensed in step (f) to determine whether the valve assembly is operable.

9. A method of testing a hydraulic control unit for controlling the application of pressurized liquid to a hydraulically actuated device, the control unit having an inlet port adapted to be connected to a means for supplying pressurized liquid and an outlet port adapted to be connected to the hydraulically actuated device, the control unit further having valve means connected between the control unit inlet and outlet ports for selectively controlling the liquid pressure at the outlet port and a hydraulic fluid storage means communicating with the valve means, the storage means having an axially movable piston disposed within a bore formed in the control unit and a resilient means to bias the piston within the bore, the test method comprising the steps of:

(a) providing a hydraulic control unit;
(b) providing means for sensing the rate of piston displacement within the bore;
(c) applying a pressurized gas to the outlet port of the hydraulic control unit;

(d) operating the valve means in a predetermined sequence to axially displace the piston within the bore; and (e) simultaneously with step (d), monitoring the rate of piston displacement sensed in step (b) to determine whether the storage means is operable.

10. The test method according to claim 9 wherein the means for sensing the rate of piston displacement includes a probe contacting a surface of the piston.

11. The test method according to claim 9 wherein step (b) includes providing means for sensing the piston displacement and step (e) includes monitoring the piston displacement sensed in step (b) to determine whether the storage means is operable.

12. The test method according to claim 9 wherein the pressurized gas in step (c) is compressed air.

13. The test method according to claim 9 wherein the pressurized gas in step (c) is an inert gas.

14. The test method according to claim 9 further including the steps of:

(f) providing a means for sensing gas pressure at the outlet port of the hydraulic control unit and means communicating with the valve means for venting the pressurized gas from the control unit;

(g) applying a pressurized gas to the inlet port of the hydraulic control unit;

(h) operating the valve means in a predetermined sequence; and (i) simultaneously with step (h), monitoring the pressure sensed in step (f) to determine whether the valve assembly is operable.

15. The test method according to claim 14 wherein step (h) includes operating the valve means to reduce the gas pressure at the control unit outlet port from an initial pressure to a final pressure.

16. The test method according to claim 15 wherein step (h) includes operating the valve means to reduce the gas pressure at the control unit outlet port to an intermediate pressure between the initial pressure and the final pressure and to hold the intermediate pressure for a predetermined time period.

17. The test method according to claim 14 wherein step (h) includes operating the valve means to increase the gas pressure at the control unit outlet port from an initial pressure to a final pressure.

18. The test method according to claim 17 wherein step (h) includes operating the valve means to increase the gas pressure at the control unit outlet port to an intermediate pressure between the initial pressure and the final pressure and to hold the intermediate pressure for a predetermined time period.

19. The test method according to claim 14 wherein step (h) includes operating the valve means to maintain the gas pressure at the control unit outlet port within a predetermined range of gas pressures for a predetermined period of time.

20. The test method according to claim 9 further including applying a pressurized gas having a pressure in a range which includes the hydraulic operating pressure for the control unit to the control unit and monitoring the rate of gas flow into the control unit for a predetermined time period to determine a rate of leakage for the control unit.

21. The test method according to claim 20 wherein the pressurized gas is compressed air.

22. The test method according to claim 20 wherein the pressurized gas is inert.

23. The test method according to claim 20 wherein the pressurized gas includes a mixture of nitrogen gas and helium gas.

24. The test method according to claim 23 wherein the mixture of nitrogen and helium gases includes a ratio of nine parts of nitrogen to one part of helium.

25. The test method according to claim 9 wherein the hydraulic control unit is included in a vehicle brake system for controlling the application of pressurized brake fluid to at least one selected wheel brake, the control unit inlet port being adapted to be connected to a means for supplying pressurized brake fluid and the control unit outlet port being adapted to be connected to the vehicle wheel brake.

26. The test method according to claim 25 wherein the hydraulic control unit is included in an anti-lock brake system.

27. The test method according to claim 25 wherein the hydraulic control unit is included in a traction control system.

* * * * *